J. H. WRIGHT.
PLANT DUSTING MACHINE.
APPLICATION FILED FEB. 13, 1922.
1,420,601.
Patented June 20, 1922.
2 SHEETS—SHEET 1.
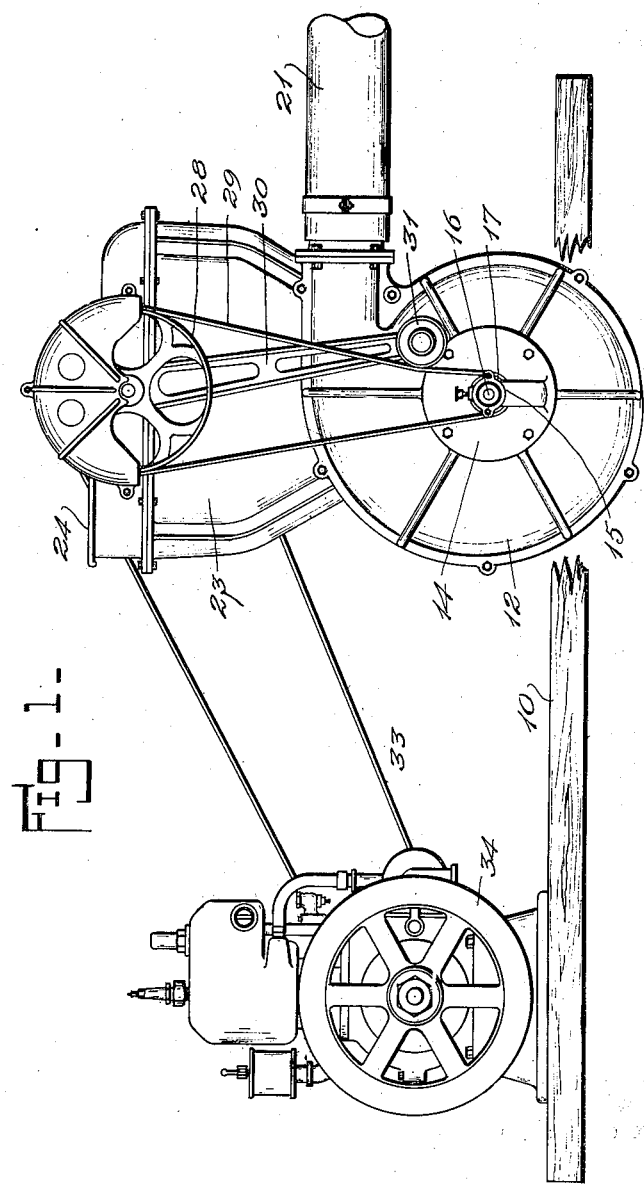
FIG-1-

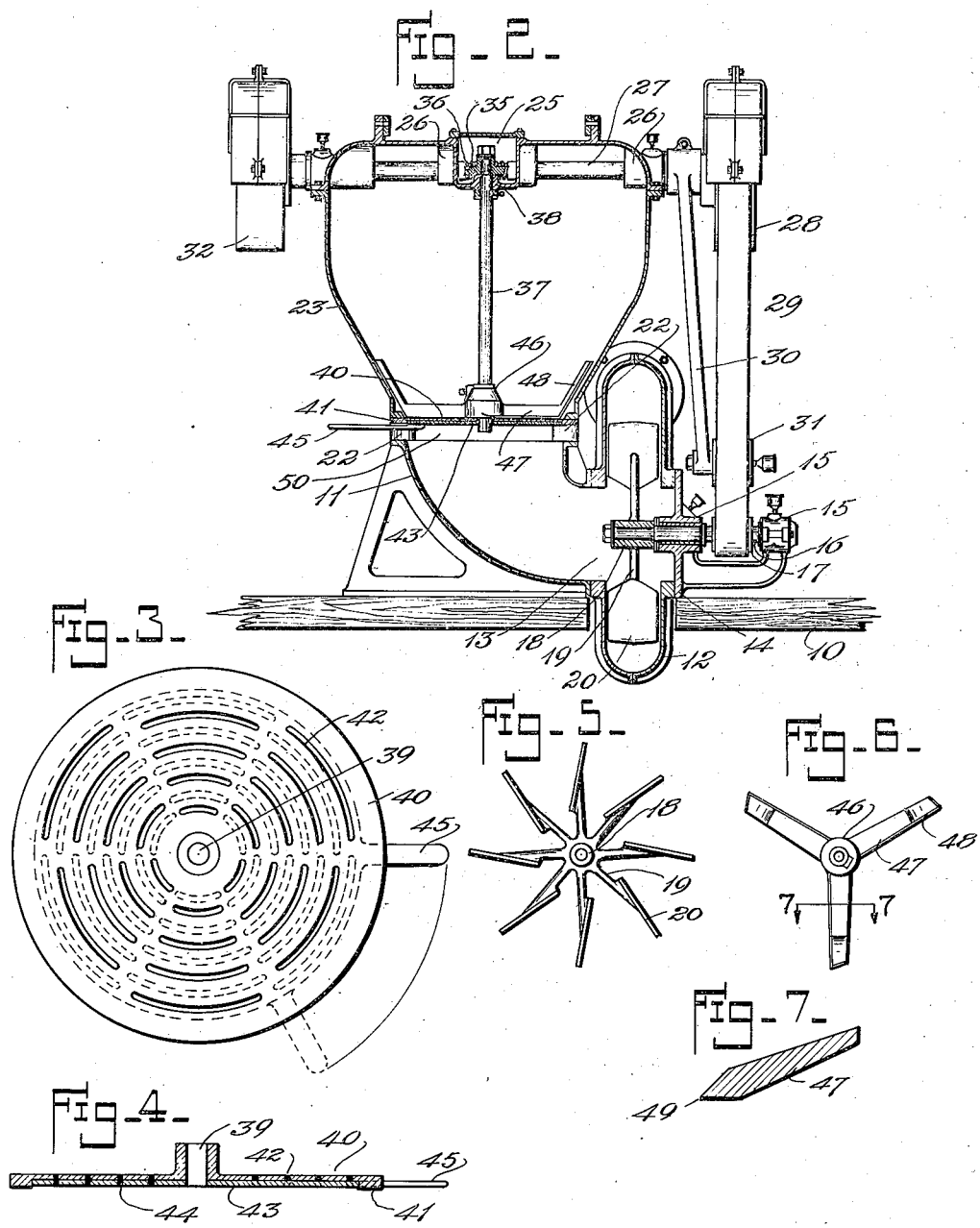

UNITED STATES PATENT OFFICE.

JACOB H. WRIGHT, OF LOUISVILLE, KENTUCKY.

PLANT-DUSTING MACHINE.

1,420,601.  Specification of Letters Patent.  Patented June 20, 1922.

Application filed February 13, 1922. Serial No. 536,302.

*To all whom it may concern:*

Be it known that JACOB H. WRIGHT, a citizen of the United States, residing at Louisville, in the county of Jefferson and State of Kentucky, have invented certain new and useful Improvements in Plant-Dusting Machines, of which the following is a specification.

This invention relates to agricultural machinery and has special reference to a machine for applying powder to growing plants for the purpose of eliminating insect and fungus pests and preventing them from injuring the plants.

More particularly the invention relates to a plant dusting machine arranged to apply an insectide or fungicide to plants in the form of a fine dust, the dust being blown onto the plant so as to cover the same evenly.

One important object of the present invention is to provide a novel general construction of machine for dusting plants.

A second important object of the invention is to provide an improved machine of this class wherein the quantity of dust to be fed can be regulated with accuracy.

A third important object of the invention is to provide a machine of this class having an improved arrangement of parts which ensures a thorough mixing of an air stream with the dust to be deposited on the plants so that the dust cloud thus formed is of uniform density throughout.

A fourth important object of the invention is the provision of an improved form of beater or agitator for such machines.

A fifth important object of the invention is to provide an improved form of blower fan for use with such machines.

With the above and other objects in view, the invention consists in general of certain novel details of construction and combinations of parts hereinafter fully described, illustrated in the accompanying drawings, and specifically claimed.

In the accompanying drawings, like characters of reference indicate like parts in the several views, and:—

Figure 1 is a side elevation of the complete machine with its driving engine.

Figure 2 is a vertical transvesre section through the machine.

Figure 3 is a plan view of the valve or feed plates of the machine, the view showing the fully open position of the plates in full lines and the closed position in dotted lines.

Figure 4 is a transverse section through said plates.

Figure 5 is a side elevation of the fan element removed from its housing.

Figure 6 is a view in plan of the beater or agitator removed from the casing.

Figure 7 is a section on the line 7—7 drawn to an enlarged scale.

In the embodiment of the invention herein illustrated, which represents one preferred type having a power drive, there is provided a base or platform 10. On this base is mounted a tapered elbow casting 11 having its larger inlet end projecting upwardly and its smaller outlet end projecting horizontally. To this outlet end is fixed a fan housing 12 of the ordinary spiral or snail shape and the inlet opening 13 of this housing communicates with the elbow 11. On the opposite side of this housing is fixed a bearing plate 14 supporting the spaced bearings 15. In these bearings is journalled the fan shaft 16 which carries between said bearings a pulley 17. The inner end of this shaft projects within the fan housing and on this inner end is mounted a fan consisting of a hub 18 from which radiates a series of arms 19 each carrying a fan blade 20. Each of these fan blades has its front face forming a plane surface and is set at an angle to the radius of its path of rotation with the outer edge tilted backwardly. By reason of this angular arrangement any small lumps of the dusting material which may enter the fan housing are struck by the fan blades and thoroughly pulverized, the fan thus acting as a beater as well as a blower. On the outlet nozzle of the housing is fitted a delivery pipe 21 which is of flexible material and which may be provided with a suitable nozzle (not shown).

On top of the elbow and held in vertically spaced relation thereto by stools 22 is a hopper 23 which is provided in its top with a filling opening normally closed by a door or hatch 24. In the center of the top of this hopper is a well 25 and in the sides of this well and the sides of the hopper are formed alined bearings 26 whereto is journalled a horizontal hopper shaft 27. One end of this shaft projects over the fan housing and on this end is fixed a pulley 28 which is connected to the pulley 17 by a belt 29. Between the pulley 28 and the hopper a swinging belt tightener arm 30 is mounted on the shaft 27 and carries at its lower edge an idler pulley 31 which bears against the belt 29. On the other end of the shaft 27 is a pulley 32 which is connected by a belt 33 to an engine 34. Thus the engine drives the shaft 27 and from this shaft the fan is driven.

Within the well 25 the shaft 27 has fixed thereon a worm 35 which meshes with a worm gear 36 carried on a vertical hopper shaft or agitator shaft 37 journalled in a bearing 38 formed in the floor of the well. The lower end of the shaft 37 fits in an opening 39 formed centrally of a fixed bottom plate 40 closing the bottom of said hopper. This plate is provided with a peripheral rib 41 so that the periphery of the plate may be held beneath the bottom edge of the hopper wall. Furthermore this plate is provided with a multiplicity of arcuate feed slots 42 arranged concentrically of said plate. Beneath the plate 40 is a second plate 43 provided with similar feed slots 44, the plate 43 being rotatably mounted within the recess formed by the rib and having a finger piece or arm 45 projecting through a slot or gap in the rib 41.

It is to be observed that the lower part of the hopper is of inverted frusto-conical form. On the lower end of the shaft 37 is fitted an agitator comprising a hub 46 from which radiates a series of agitator arms 47 having upwardly bent outer ends 48 conforming to the frusto-conical lower portion of the hopper. As can be seen best in Figure 7 each of these agitator arms or blades is arranged to lie in cross section at an acute angle to the plate or hopper wall and has an acutely sharpened forward edge 49 acting as a scraper. Also this angular disposition of these blades or arms is such that their top surfaces incline upwardly and rearwardly so that the material in the hopper will be constantly scraped off the plate and hopper wall and lifted up and dropped thus ensuring the breaking up of all lumps so that such material may readily find its way through the feed slots.

In operation the feed hopper is supplied with suitable material such as sulphur, Bordeaux mixture, nicotine contact dust or other like material, and this can be done whether the machine is running or is quiescent. The lower feed plate is adjusted to the desired feed, the arrangements of slots being such that up to fifty pounds per acre of dust may be supplied. With the fan going this material drops through the plate slots and is mixed with air entering the spaces 50 immediately beneath said plates. The dust laden air is drawn into the fan where any small agglomerations of material are broken up and the dust cloud is delivered through the pipe 21.

There has thus been provided a simple and efficient device of the kind described and for the purposes specified.

It is obvious that minor changes may be made in the form and construction of the invention without departing from the material principles thereof. It is not therefore desired to confine the invention to the exact form herein shown and described, but it is wished to include all such as properly come within the scope claimed.

Having thus described the invention, what is claimed as new, is:—

1. In a plant dusting machine, a hopper having a bottom provided with a multiplicity of perforations, means beneath said bottom for opening and closing the perforations, a tubular member beneath said hopper arranged to provide air inlets close beneath the hopper bottom, and a blower fan having its suction side connected to said tubular member.

2. In a plant dusting machine, a hopper having a bottom provided with a multiplicity of perforations, means beneath said bottom for opening and closing the perforations, a tubular member beneath said hopper arranged to provide air inlets close beneath the hopper bottom, a blower fan having its suction side connected to said tubular member, and an agitator in said hopper arranged to agitate and break up the material resting on the hopper bottom.

3. In a plant duster, a hopper, an elbow having an inlet end arranged in spaced relation below said hopper to provide air inlet spaces between the hopper and elbow, a plate forming the bottom of the hopper and provided with a multiplicity of concentric slots forming delivery openings, a second plate pivoted centrally of the first plate and similarly provided with slots, means to move the second plate to bring its slots into the first plate whereby to vary the effective area of the slots for delivery of material from said hopper, and a blower fan having its suction side connected to said elbow.

4. In a plant duster, a hopper an elbow having an inlet end arranged in spaced relation below said hopper to provide air inlet spaces between the hopper and elbow, a plate forming the bottom of the hopper and provided with a multiplicity of concentric slots forming delivery openings, a second plate pivoted centrally of the first plate and similarly provided with slots, means to move the second plate to bring its slots into the first plate whereby to vary the effective area of the slots for delivery of material from said hopper a blower fan having its suction side connected to said elbow, and a combined agitator and scraper traversing the upper surface of the first mentioned plate.

5. In a plant duster, a hopper an elbow having an inlet end arranged in spaced relation below said hopper to provide air inlet spaces between the hopper and elbow, a plate forming the bottom of the hopper and provided with a multiplicity of concentric slots forming delivery openings, a second plate pivoted centrally of the first plate and similarly provided with slots, means to move the second plate to bring its slots into the first plate whereby to vary the effective area of the slots for delivery of material from said hopper blower fan having its suction side connected to said elbow, a combined agitator and scraper traversing the upper surface of its first mentioned plate, a shaft extending transversely across the upper part of said hopper, a belt connection between said shaft and fan, a shaft arranged vertically of the hopper and having said agitator mounted thereon, and a gear connection between said shafts.

In testimony whereof I affix my signature.

JACOB H. WRIGHT.